US006371502B1

(12) United States Patent
Howlett et al.

(10) Patent No.: US 6,371,502 B1
(45) Date of Patent: Apr. 16, 2002

(54) UNIVERSAL CONVERSION KIT FOR HUMAN POWERED WHEELCHAIRS

(76) Inventors: R Keith Howlett; Charles F Timmreck, both of 2165 Fitchburg Rd., Stockbridge, MI (US) 49285

( * ) Notice: Subject to any disclaimer, the term of this patent is extended or adjusted under 35 U.S.C. 154(b) by 0 days.

(21) Appl. No.: 09/513,977

(22) Filed: Feb. 27, 2000

(51) Int. Cl.[7] ..................................... B62M 1/16

(52) U.S. Cl. .................... 280/304.1; 188/2 F; 280/246; 280/258

(58) Field of Search ........................ 280/250.1, 304.1, 280/244, 246, 247, 248, 249, 253, 255, 256, 257, 258; 188/2 F, 71.7, 265

(56) References Cited

U.S. PATENT DOCUMENTS

| | | | | | |
|---|---|---|---|---|---|
| 483,495 | A | * | 9/1892 | Hunter | |
| 1,400,917 | A | * | 12/1921 | S-paulding | |
| 3,889,964 | A | * | 6/1975 | Pitts | 280/293 |
| 4,354,691 | A | * | 10/1982 | Saunders | |
| 4,358,126 | A | * | 11/1982 | Mitchell | 280/246 |
| 4,735,431 | A | * | 4/1988 | Tait | 280/246 |
| 5,007,655 | A | * | 4/1991 | Hanna | 280/250.1 |
| 5,020,818 | A | * | 6/1991 | Oxford | 280/250.1 |
| 5,228,709 | A | * | 7/1993 | Kao | 280/250.1 |
| 5,613,697 | A | * | 3/1997 | Johnson | 280/250.1 |
| 5,865,455 | A | * | 2/1999 | Taylor | 280/250.1 |
| 6,024,369 | A | * | 2/2000 | Goldstein et al. | 280/248 |

* cited by examiner

*Primary Examiner*—Anne Marie Boehler
(74) *Attorney, Agent, or Firm*—Michael I Kroll

(57) ABSTRACT

The present invention provides an economical, universal wheelchair conversion kit which offers two, hand-powered, variable-resistive, drive mechanisms for the main wheels of a wheelchair which can be retrofitted to existing wheelchairs and that provide the operator of the vehicle means of easy mobility, independent brakes for safety and maneuverability, and the resistive means for exercising the upper body musculature and the cardiovascular systems while using the chair in either a mobile or stationary configuration. The present invention enables the elevation of the wheelchair rear wheels such that the wheelchair is dedicated to an exercise function. In all, the present invention provides a comprehensive solution to the mobility and immobility health related problems of many wheelchair bound persons.

14 Claims, 11 Drawing Sheets

UNIVERSAL CONVERSION KIT FOR HUMAN POWERED WHEELCHAIRS

BACKGROUND OF THE INVENTION

1. Field of the Invention

The present invention relates generally to wheelchairs and, more specifically, to wheelchairs employing mechanisms that increase the mechanical advantage to reduce the effort of propelling the vehicle while conversely providing the means of increasing that effort to allow the operator to use the wheelchair as an exercise machine for maintaining physical fitness. The present invention, the Easy Glide Chair Kit, provides a wheelchair so equipped: with two separate hand-operated brakes for each wheel, two tensioning bolts for varying the operating resistance of each main wheel, two extendable legs for immobilizing the chair for exercise operation only and two hand-operated drive mechanisms for each main wheel which allow the operator to propel the chair forward or backward, stop and turn, using differential input.

The drive mechanism consists of a hand-operated, generally vertically-oriented lever connected to a reversible ratchet assembly that in turn drives a speed-reducing gear assembly consisting of a smaller ratchet-driven ratchet/gear cluster driving the larger gear which is rigidly mounted to and axially aligned with each main wheel. Additionally, adjustable resistive means are provided for each side for increasing or decreasing the force required to operate the handle to provide the operator with means for selectively exercising the upper muscular and cardiovascular systems. Another health related feature of the present invention is its ability to convert a wheelchair to use purely as an exercise machine, by providing a pair of extendable legs or jacks mounted on either side at the rear portion of the chair for lifting the main wheels off the ground, thereby allowing them to rotate freely. In all, the present invention provides a more comprehensive solution, compared to prior art, to the mobility and immobility health related problems of wheelchair bound persons.

2. Description of the Prior Art

There are other hand operated drive systems designed for wheelchairs. Typical of these is U.S. Pat. No. 4,460,190 issued to Spiess on Jul. 17, 1984.

Another patent was issued to Herron on Dec. 24, 1985 as U.S. Pat. No. 4,560,181. Yet another U.S. Pat. No. 4,758,013 was issued to Agrillo on Jul. 19, 1988 and still yet another was issued on Apr. 28, 1998 to Weaver as U.S. Pat. No. 5,743,544.

U.S. Pat. No. 4,460,190

Inventor: Erick M. Spiess

Issued: Jul. 17, 1984

A three wheeled wheelchair wherein two of the wheels are leading wheels with the single wheel being a trailing wheel. The wheelchair is propelled through the use of a chain drive assembly which is to be manually operated through the use of a handle assembly. Adjacent the handle assembly is a seat which is to support the occupant of the wheelchair. The seat is cushionly supported by a shock absorber assembly. The handle assembly is attached to a steering mechanism which, through lateral movement of the handle assembly, causes the leading wheels to be turned in respect to the frame of the wheelchair. A separate turning wheel assembly is to be manually movable to an extended position to cause the trailing wheel to be spaced from the supportive surface thereby permitting three hundred and sixty degree turning of the wheelchair about a single point.

U.S. Pat. No. 4,560,181

Inventor: Matthew A. Herron

Issued: Dec. 24, 1985

A wheelchair and drive mechanism powered by reciprocating operation of a drive lever. The drive mechanism provides a continuously variable gear ratio allowing wheelchair operation at varying speeds and on differing inclines; and is readily fitted to a standard wheelchair by a drive-associated bayonet mount. A drive mechanism ratchet wheel includes an upper and lower radial crank secured for rotation thereabout by an axle. Each crank includes a pawl assembly that engages with circumferential ratchet wheel teeth to transfer drive energy supplied to the radial cranks from connecting arms to the ratchet wheel. The connecting arms are coupled to a reciprocating lever arm and operate in concert with the pawls to alternately engage with and transfer energy to the ratchet wheel, or disengage therefrom. While one connecting arm and associated pawl is transferring energy to the ratchet wheel, the other connecting arm is disengaging an associated pawl from the ratchet wheel. Energy is transferred during both a forward and rearward stroke of the lever arm to effect efficient wheelchair and drive operation.

U.S. Pat. No. 4,758,013

Inventor: Timothy P. Agrillo

Issued: Jul. 19, 1988

A hand crank powered wheelchair with forward, coast, reverse, and braking capability. The wheelchair has a left and right hand crank. Each hand crank is used to independently control the two rear wheels. A clutch and brake is contained in the hub of each rear wheel. The clutch drives wheel forward when hand crank is rotated forward and allows wheel to coast when hand crank stops rotation. A reverse enable lever selects brake or reverse mode. When in brake mode minimal energy applied to crank in the reverse direction will slow or stop rear wheel. When in reverse mode, brake acts as clutch, allowing reverse rotation of hand crank to drive rear wheel backward. The drive may include a gear shift mechanism. Drives of the invention may be applied to other wheeled vehicles such as delivery tricycles.

U.S. Pat. No. 5.743,544

Inventor: Michael J. Weaver

Issued: Apr. 28, 1998

An improved wheelchair and hub assembly is described that interposes reduction gearing between the handring or rotatable hand wheel and the drive wheel of the assembly. This gearing provides some mechanical advantage to users who may lack sufficient strength to propel themselves in a conventional wheelchair, especially in a home environment. A single speed assembly is described which is operated conventionally by rotating handrings either forward or rearward to produce a corresponding rotation of the drive wheel but, unlike conventional wheels, a complete revolution of the handring results in only a partial revolution of the drive wheel. In the hub of the assembly is a wheel locking mechanism which enables the wheel to be easily and positively locked for the safety of the user, preventing rotation of the wheel in either direction. Additionally, a ratcheting mechanism is incorporated into the hub design which can be engaged to allow forward rotation but prevent rearward rotation of the drive wheels.

While these wheelchair hand operated drive systems may be suitable for the purposes for which they were designed, they would not be as suitable for the purposes of the present invention, as hereinafter described.

SUMMARY OF THE PRESENT INVENTION

A primary object of the present invention is to provide a universal conversion kit for a wheelchair with independent, hand-powered, lever-operated, speed reducing, drive mechanisms for each wheel whereby the operator thereof may be able to easily propel the wheelchair forward, backward, as well as turn using differential input.

Another object of the present invention is to provide a universal wheelchair conversion kit with independent, hand-powered, speed reducing, drive mechanisms for each wheel that also provides independently operating hand brakes for safety and maneuverability.

Another object of the present invention is to provide a universal wheelchair conversion kit with independent, hand-powered, speed reducing, drive mechanisms for each wheel, independent hand brakes, and means for varying the input drive effort to allow the operator to use the wheelchair as a mobile exercise machine to improve and maintain upper body muscular and cardiovascular systems.

A still further object of the present invention is to provide a universal wheelchair conversion kit with independent, hand-powered, speed reducing, drive mechanisms for each wheel, with independent hand brakes, means for operating as a mobile exercise machine, having further means for converting the mobile exercising capability to a stationary configuration.

Additional objects of the present invention will appear as the description proceeds.

The present invention overcomes the shortcomings of the prior art by providing an economical, universal wheelchair conversion kit which offers two, hand-powered, variable-resistive, drive mechanisms for the main wheels of a wheelchair which can be retrofitted to existing wheelchairs and that provide the operator of the vehicle means of easy mobility, independent brakes for safety and maneuverability, and the resistive means for exercising the upper body musculature and the cardiovascular systems while using the chair in either a mobile or stationary configuration. In all, the present invention provides a more comprehensive solution, compared to prior art, to the mobility and immobility health related problems of wheelchair bound persons.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE REFERENCED NUMERALS

Figure 1:
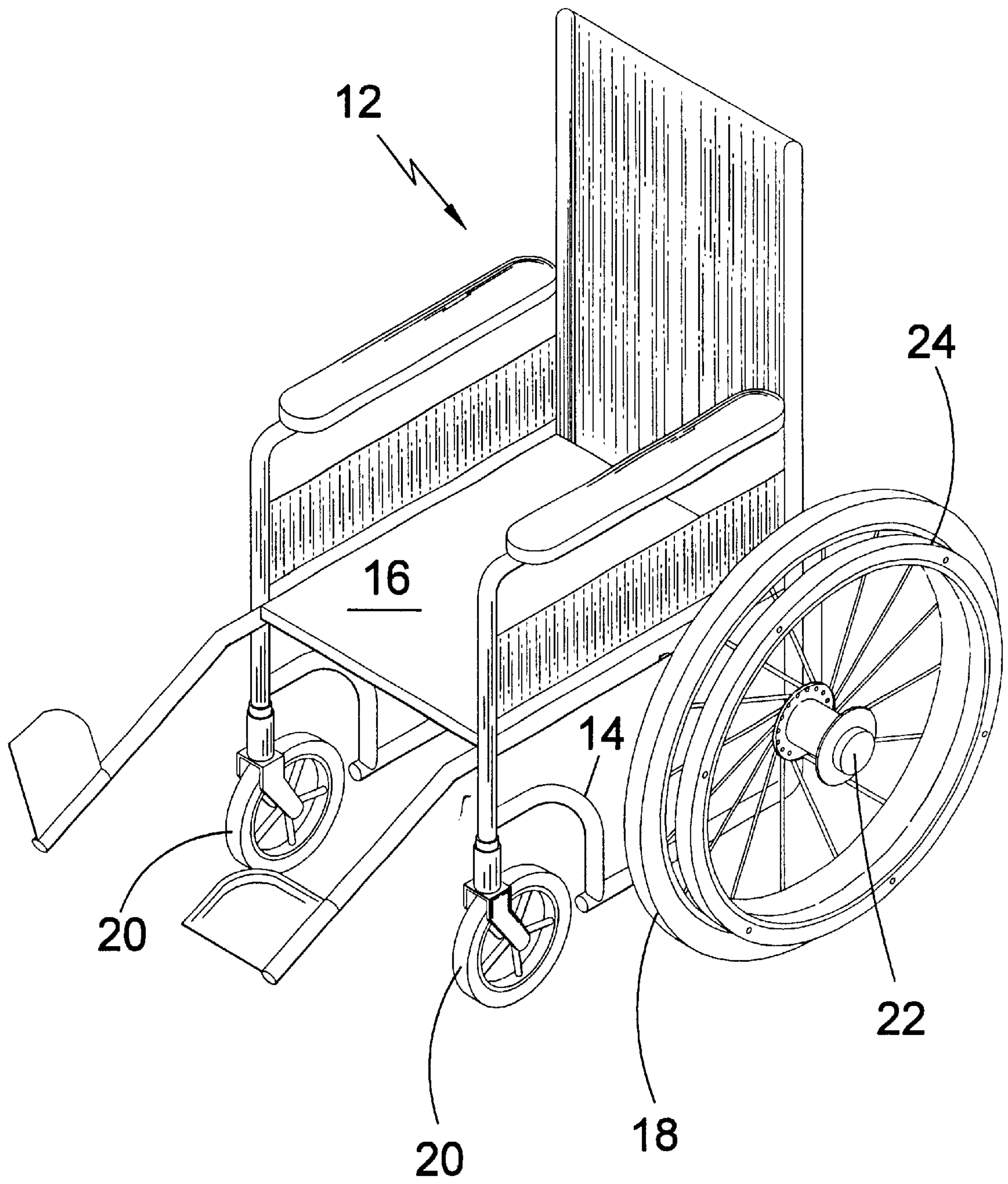
FIG. 1 is a perspective view of a wheelchair of the prior art which has been designed to reduce the amount of exertion needed to operate the chair. Although there are times when this is desirable it would be more advantageous if the operator were permitted to selectively adjust the amount of resistance as desired, as well as, being able to use the chair as a stationary exercising device.

Turning now descriptively to the drawings, in which similar reference characters denote similar elements throughout the several views, the Figures illustrate the universal conversion kit for human powered wheelchairs of the present invention. With regard to the reference numerals used, the following numbering is used throughout the various drawing figures.

10 universal conversion kit for human powered vehicles of the present invention
12 prior art wheelchair
14 wheelchair frame
16 wheelchair seat
18 wheelchair rear wheels
20 wheelchair front wheels
22 wheelchair axle
24 handring
30 rear wheel gears
32 attachment members for attaching rear wheel gear to wheelchair rear wheel
34 housings
36 U-bolts
38 axles
40 grease fittings
42 ratchet mechanisms
44 handles
46 handle grips
48 knuckles
50 drive gears
52 handle first portion
54 handle second portion
56 opposing spaced hole pairs in handle second portion
58 pair of holes in handle first portion
60 pin
70 tension members
80 legs
82 non-skid caps
90 hydraulic jacks
92 junction box for jack controls
94 manual pumps
96 handheld control
100 brake members
102 brake member first portion
104 brake member grip
106 brake member second portion
108 brake pad
109 brake spring

DETAILED DESCRIPTION OF THE PREFERRED EMBODIMENT

Turning now descriptively to the drawings, in which similar reference characters denote similar elements throughout the several views, FIGS. 1 through 11 illustrate the universal conversion kit for human powered vehicles of the present invention indicated generally by the numeral 10.

A typical wheelchair 12 is depicted in FIG. 1 without the benefit of the present invention. It includes a frame 14, a seat 16, two large rear wheels 18 attached to the frame 18, and two pivoting smaller wheels 20, also attached to the frame 14. The rear wheels 18 have an axle 22 attached to the frame 14. The wheelchair 12 is typically propelled by grasping and turning a handring 24, which is attached to each rear wheel 18.

FIGS. 2–7 depict a rear wheel gear 30 that is rigidly attached to each of the wheelchair rear wheels 18 by attachment members 32, or by attachment (not shown) to the wheelchair axle 22. A housing 34 is attached on each side of the frame 14 by U-bolts 36 as more closely shown in FIGS. 2 and 9. Each housing 34 supports an axle 38, the axle 38 having a grease fitting 40 for servicing.

Attached to each such axle 38 is a reversible ratchet mechanism 42. To each such ratchet mechanism 42 is attached a handle 44, with each handle 44 having a grip 46 and a knuckle 48. Also attached to each axle 38 is a drive gear 50 that is positioned to mesh with the corresponding rear wheel gear 30. The handle 44 works the ratchet mechanism 42 such that manipulation of the handle 44 selectably rotates the drive gear 50 in a first direction, for forward motion of the wheelchair 12, and a second direction, for rearward motion of the wheelchair 12. The occupant has the choice of grasping either the grip 46 or the knuckle 48, for purposes of such manipulation.

Figure 11:
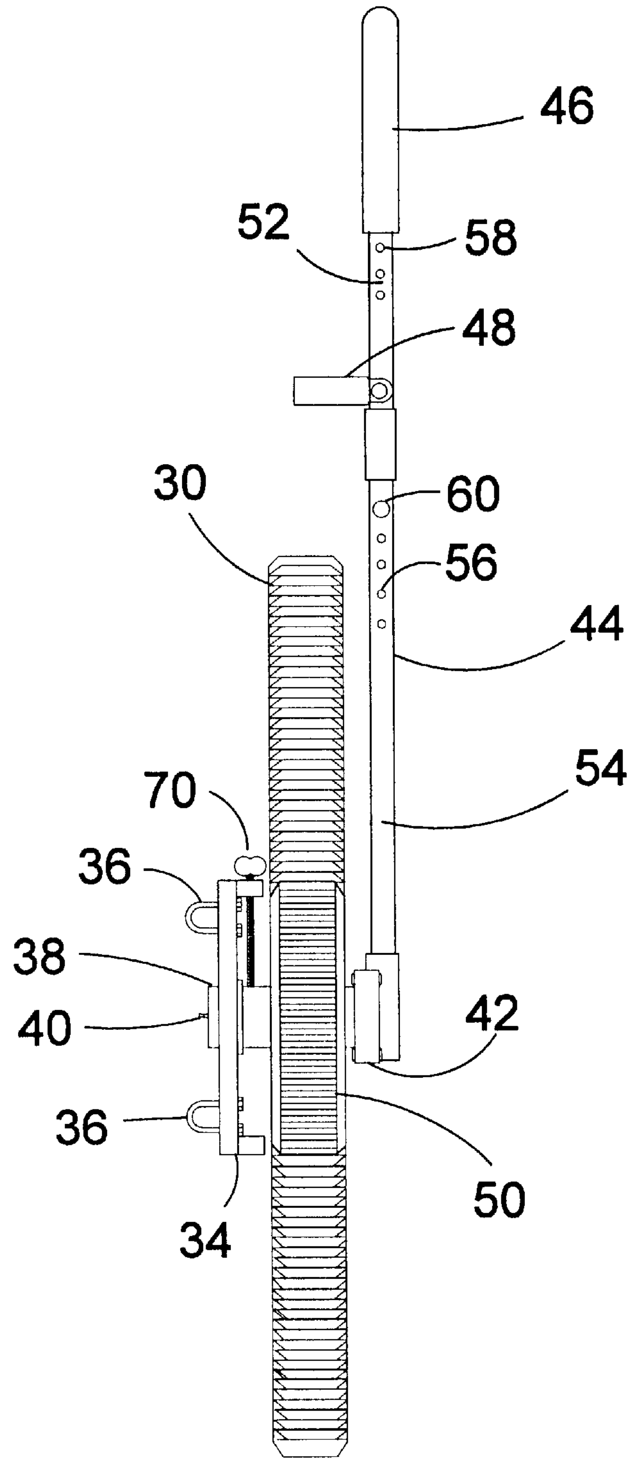
FIG. 11 is an enlarged front plan view of the drive mechanism and tensioning member used to increase the force necessary for the operator to rotate the wheelchair rear wheels, whether the wheelchair is being used as a stationary exercise device or a means for transportation. Also shown is the knuckle, which is used as an alternate means for ratcheting the handle. Also shown are the axle, u-bolts for attachment to wheelchair, housing, handle, and grip. knuckle, ratchet mechanism, drive gear, and rear wheel gear.

Each handle 44 has a first portion 52 and a second portion 54, the second portion 54 telescoping within the first portion 52, the second portion 54 having at least two pair of opposing spaced hole pairs 56, and the first portion 52 having at least one pair of opposing spaced hole pairs 58, that is alignable with one of such spaced hole pairs 56, such that a pin 60 or other member, may be inserted through both portions 52,54, as depicted in FIG. 11. This allows the length of each handle 44 to be independently adjusted. The handle adjustability is also present in other embodiments (not shown) where the second handle portion 54 screws into the first handle portion 52, where the second handle portion 54 has a spring loaded member which aligns with and protrudes through a hole in the first handle portion 52, where the foregoing adjustability components and functions of the first and second handle portions 52,54 are reversed, and other mechanisms in accordance with the present invention, and as determined by the intended end use for the overall handle 44 assembly, as will occur to those of skill in the art upon review of the present disclosure.

The adjustability of the handle 44 acts to increase the force required from the operator to work the ratchet mechanism 42 and rotate the drive gear 50, in that the handle 44 acts as a moment arm, and a shorter moment arm requires a higher load to be applied in the pushing or pulling of the handle 44. Similarly, use of the knuckle 48 always results in a shorter effective moment arm when compared to the grip 46, regardless of the length to which the handle 44 is set.

Resistance to rotation of the drive gear 50 is also provided by the tension members 70 depicted in FIGS. 2,5–7, and 9. Each tension member 70 is positioned on the housing 34 such that, when adjusted, the tension member 70 bears upon the axle 38, although a similar result could be achieved by bringing such a member to bear on the drive gear 50. In this embodiment, the tension member 70 is a bolt, which is threadably mounted on each housing 34 such that rotation of the bolt forces it to bear upon the axle 38. The amount of resistance to rotation of the drive gear 50 is variable, depending upon the extent to which the tension member 70 is brought to bear against the axle 38.

The handrings 24 can be relocated to a position adjacent the rear wheel gears 30, reestablishing the original means of propulsion as a continuously available alternate to the present invention.

Figure 3:
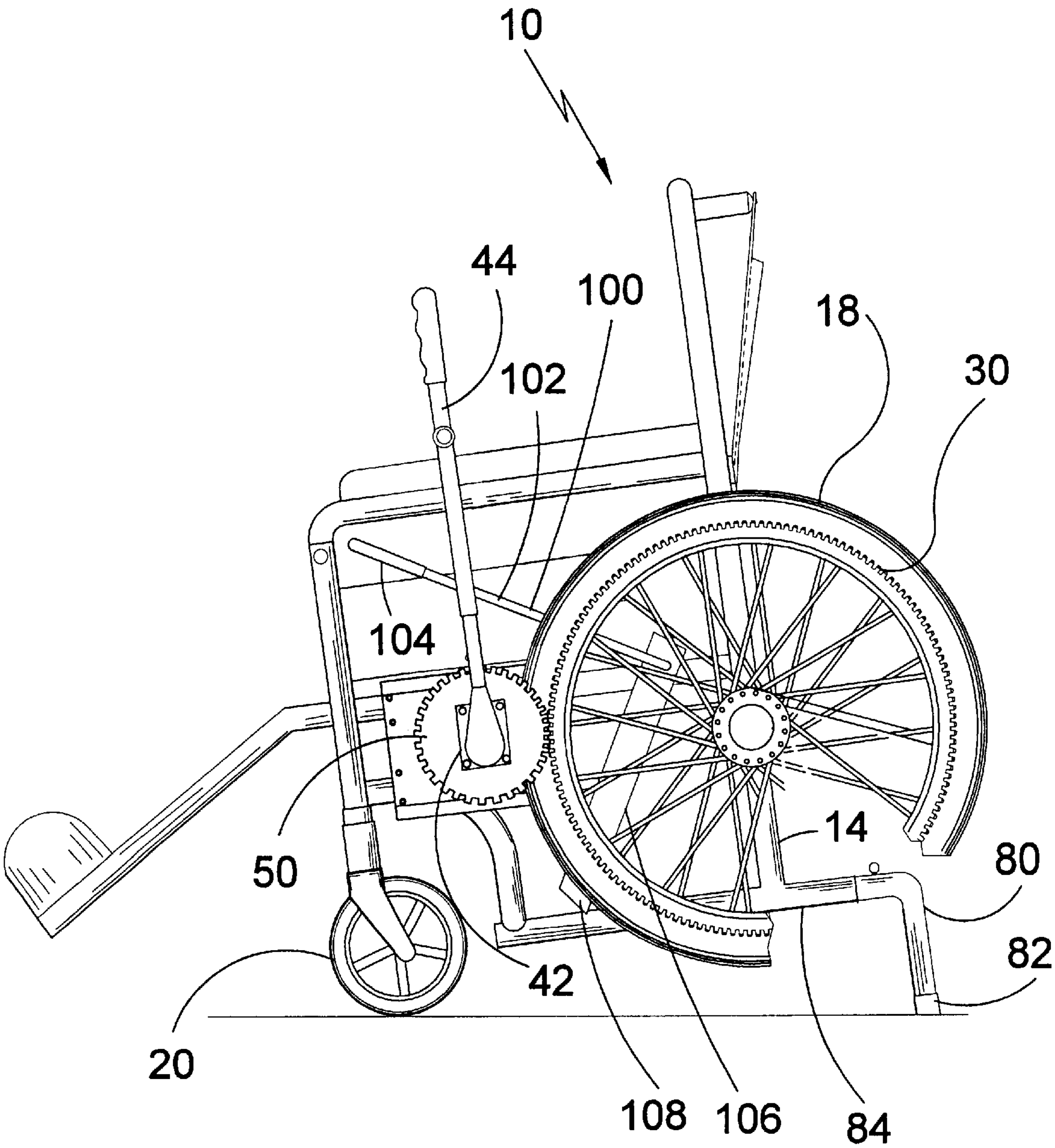
FIG. 3 is a left side view of the present invention installed on a wheelchair. Shown is a partial view of the rear wheel gear engaging the ratcheting system drive gear, whereby the wheelchair can be selectively propelled by means of a length adjustable handle, or as illustrated, the rear of the wheelchair can be raised by attachable legs whereby the wheelchair can be used as a stationary exercise device. Also shown is the hand-operated brake for stopping the rotation of the left wheelchair rear wheel.

FIG. 3 depicts a pair of legs 80 which can be attached to the wheelchair frame 14, the legs lifting the wheelchair 12 such that the rear wheels 18 are disengaged from the floor or other ground surface. This, and other embodiments of the present invention that provide such rear wheel 18 disengagement, completely dedicates the wheelchair 12 to an exercise function, allowing the occupant to engage in exercises for upper muscular and cardiovascular systems. The addition of non-skid caps 82 provides a stabilizing effect by resisting movement on the front wheels 20. As shown in FIG. 3, typical wheelchair frame 12 structure readily receives the legs 80. In the absence of the particular wheelchair frame 12 structure shown in FIG. 3, common fastening devices (not shown), e.g. clamps, grips, can be provided as part of the legs 80 for attachment of the legs 80 to various wheelchair frame 12, such as the frame sides 84.

Figure 2:
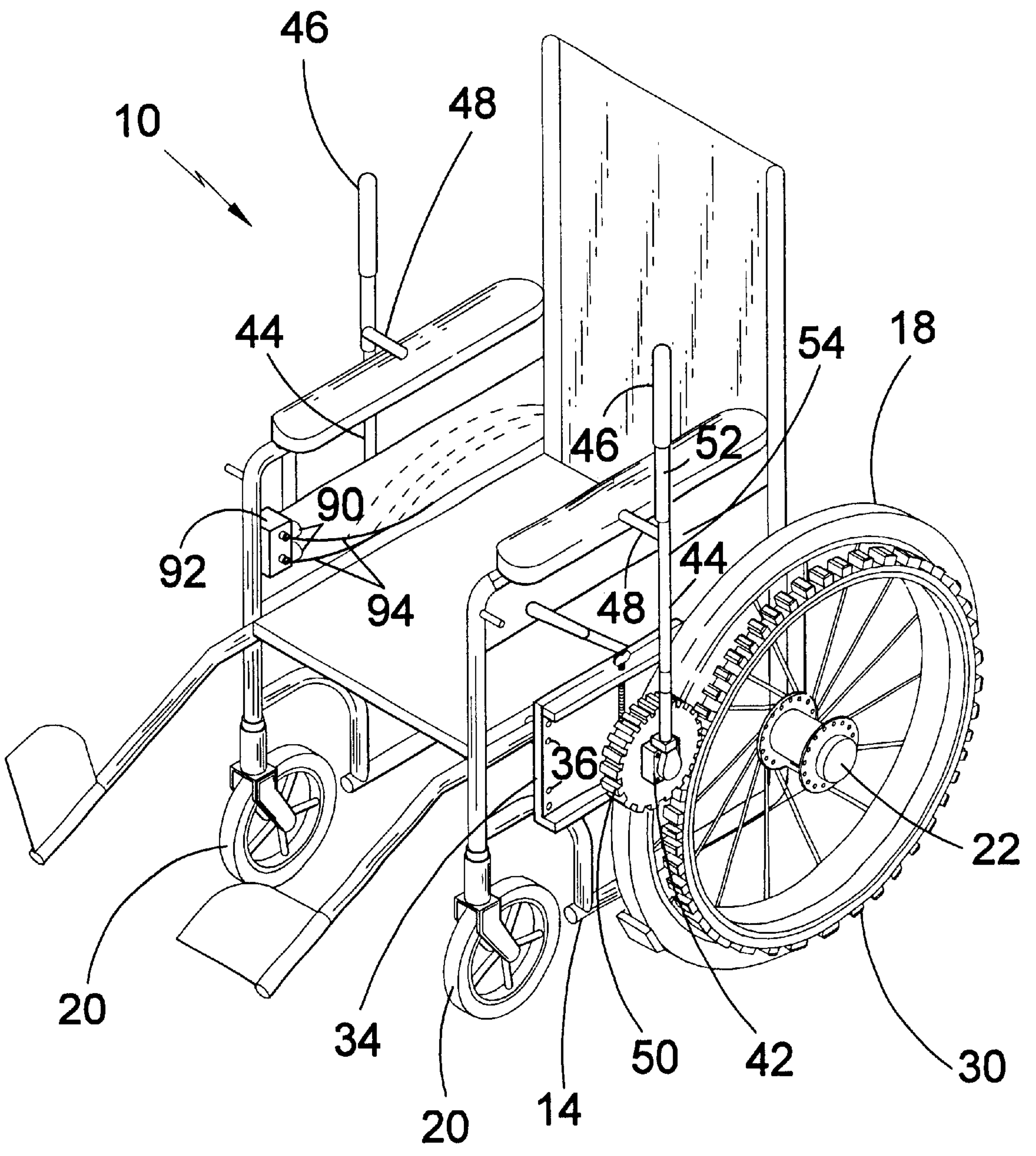
FIG. 2 is a perspective view of the present invention installed on the wheelchair shown in FIG. 1. Shown is a housing attached to the wheelchair frame, and a drive gear attached to an axle on the housing. The axle has a ratchet mechanism attached thereon, the ratchet mechanism engaging the drive gear, the ratchet mechanism having a gear shaft with slidably engageable members. The drive gear engages a large gear on the rear wheel. Also shown is a junction box having controls for engaging a lifting mechanism for selectively raising the rear wheels from an engaging position to a non-engaging position, whereby the wheelchair can be operated as a stationary exercise device.
Figure 4:
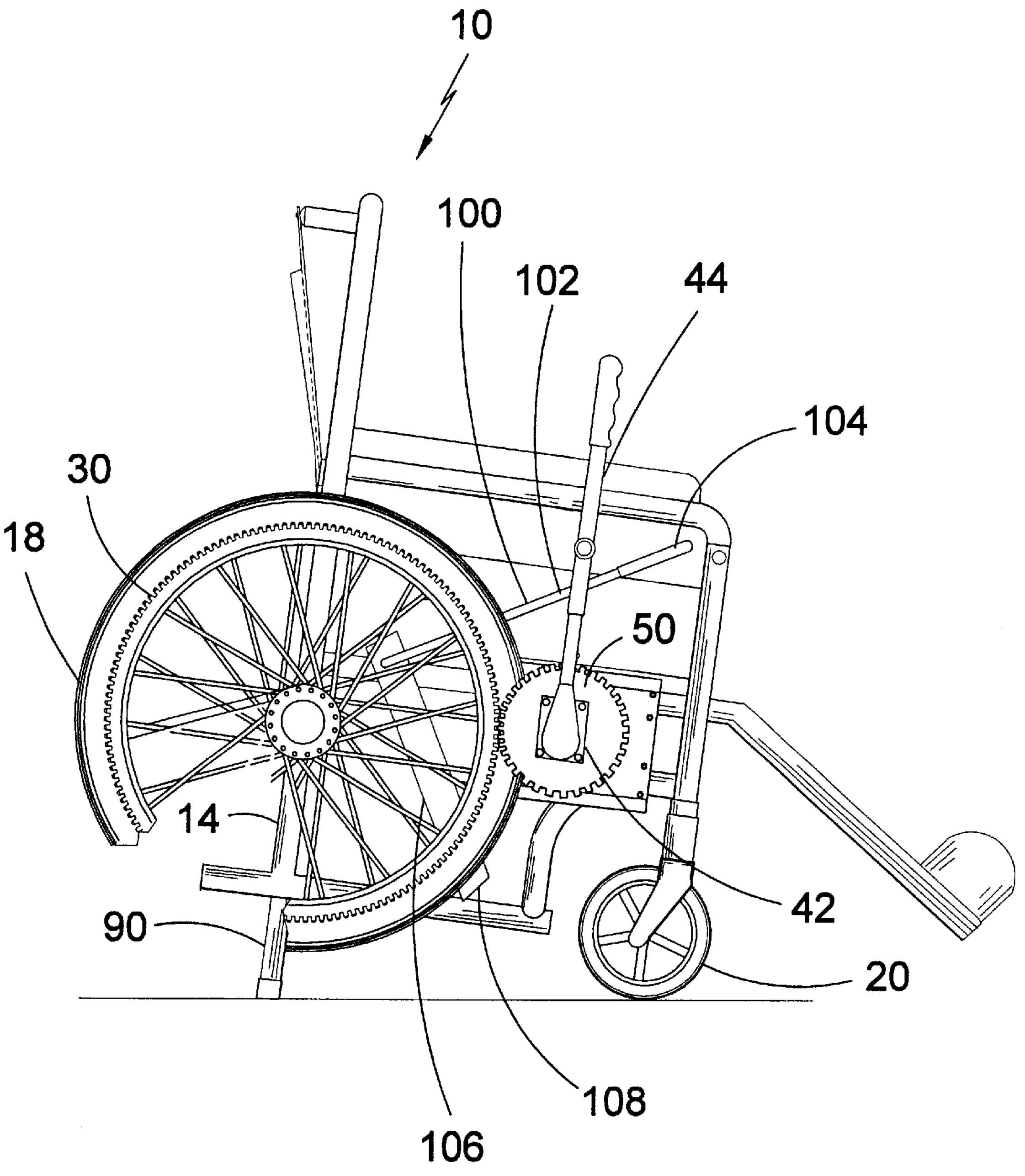
FIG. 4 is a right side view of the present invention installed on a wheelchair. Shown is a partial view of the rear wheel gear engaging the gear ratcheting system drive gear, whereby the wheelchair can be selectively propelled by means of a length adjustable handle, or as illustrated, the rear of the wheelchair can be manually, hydraulically, or electromechanically raised, whereby the wheelchair can be used as a stationary exercise device. Also shown is the hand-operated brake for stopping the rotation of the right wheelchair rear wheel.
Figure 5:
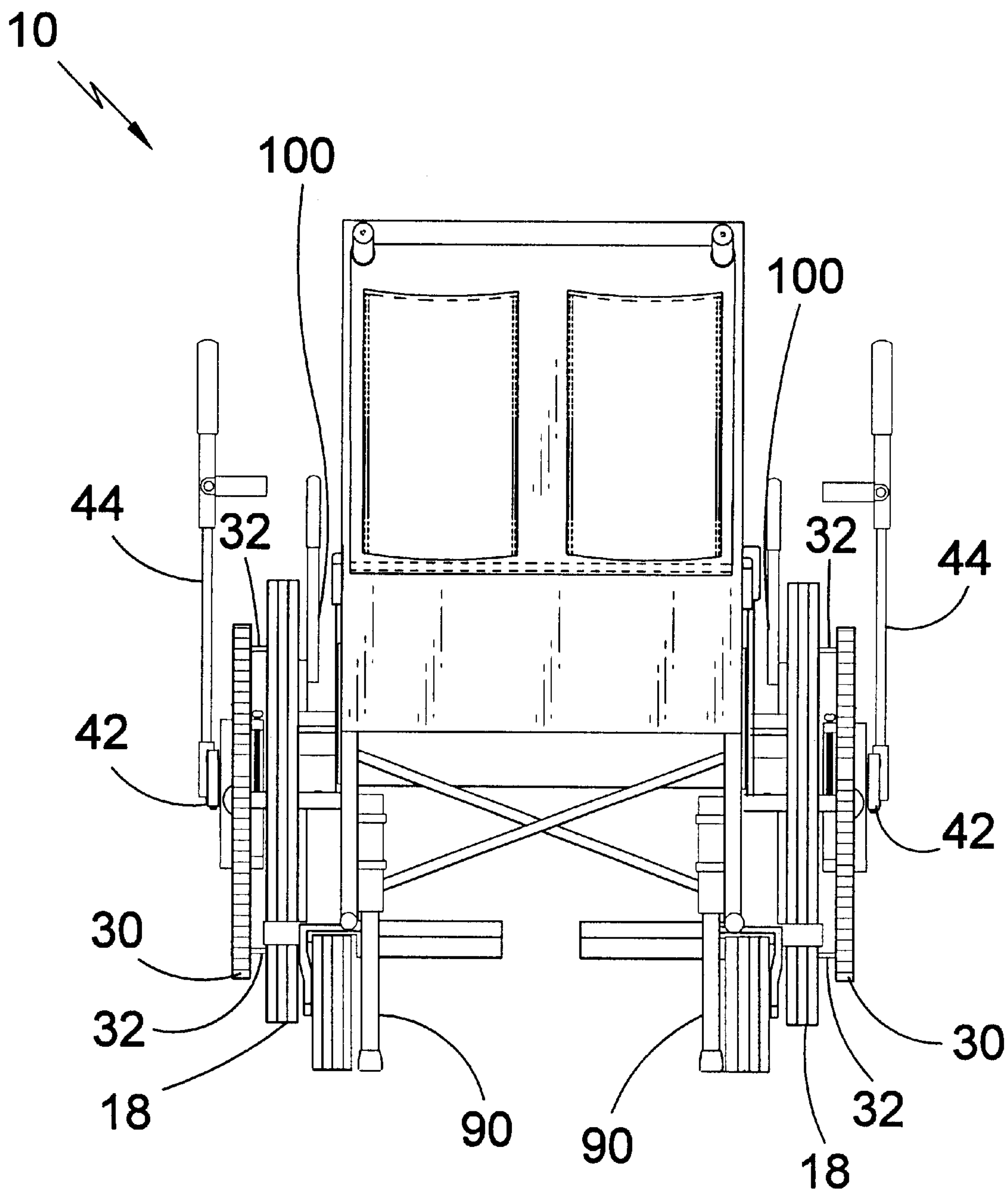
FIG. 5 is a rear view of the present invention installed on the wheelchair. Shown are the rear wheels of the wheelchair, the same having been raised and supported to a predetermined position on the jacks, whereby the wheelchair can be operated as a stationary exercise device.
Figure 6:
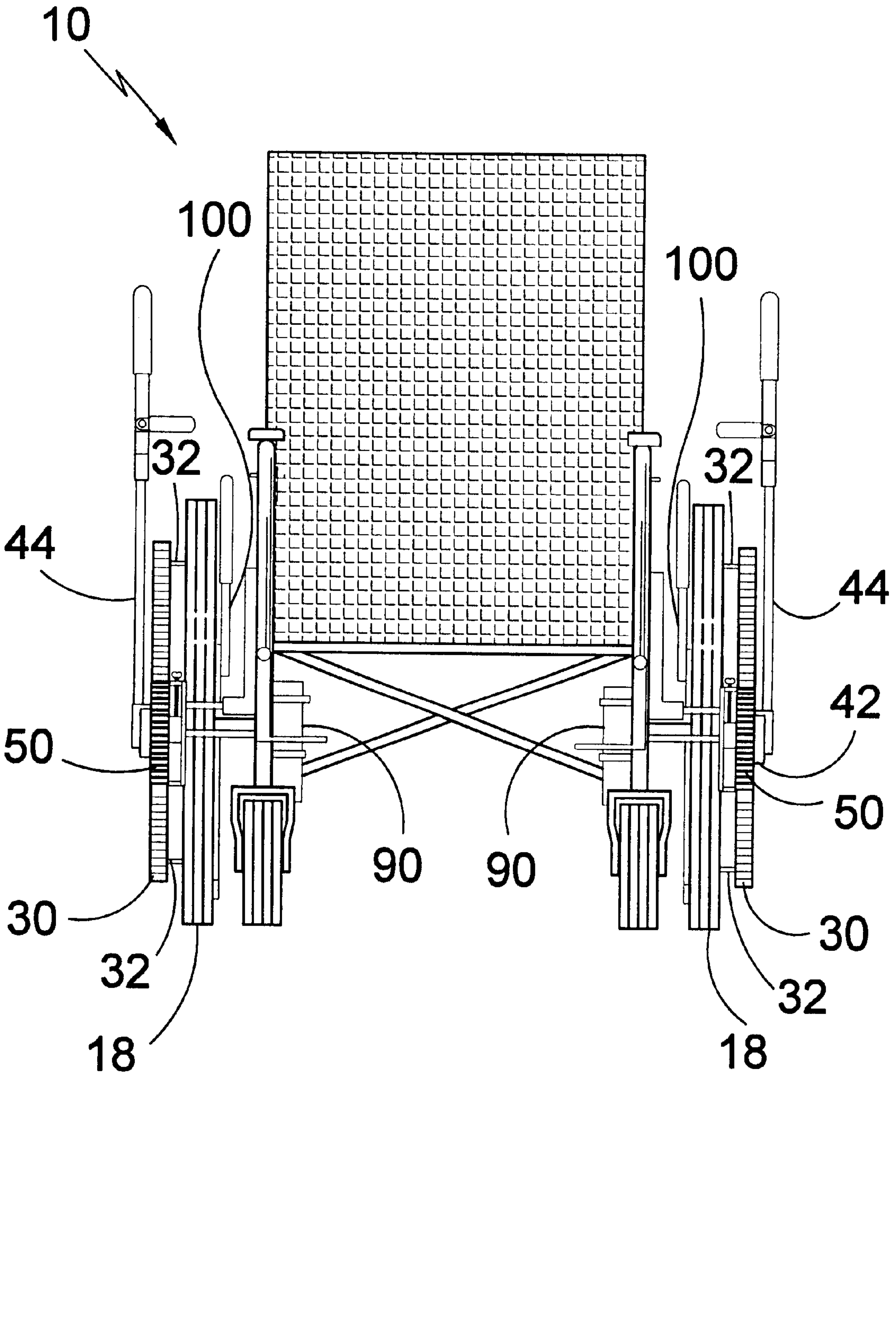
FIG. 6 is a front view of the present invention installed on the wheelchair. Shown are extendable and retractable handles having resistive motion means for increasing the amount of energy expended by the operator in propelling the wheelchair from one location to another, or in turning the rear wheels, should the lifting mechanisms be engaged and the resistive motion mechanism further engaged. Also shown are the hand-operated brakes for stopping the rotation of the wheelchair rear wheels.
Figure 7:
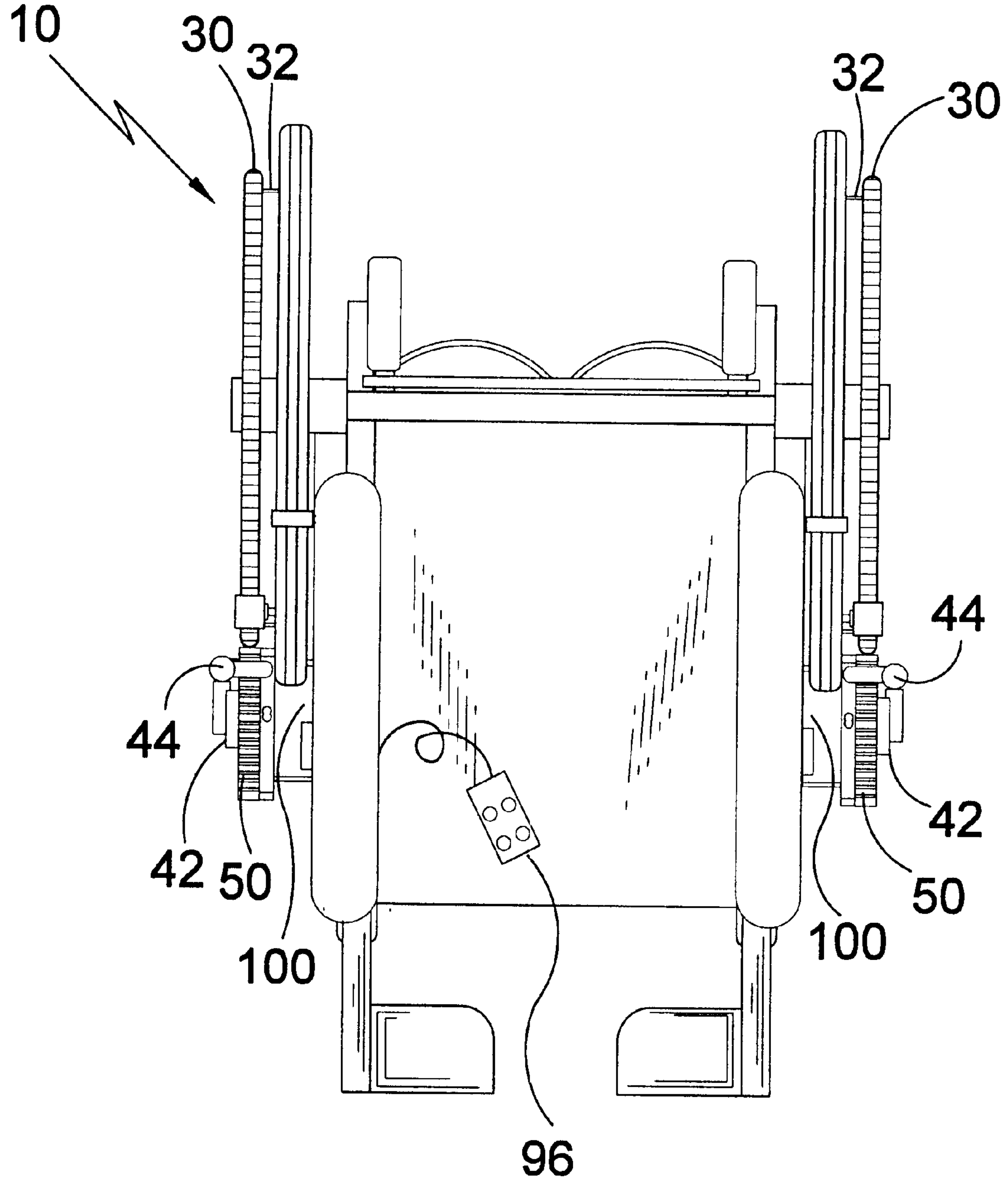
FIG. 7 is a top plan view of the present invention installed on the wheelchair, further depicting the alignment of the drive gears with the rear wheel gears, and the positioning of the handles and the brake handles.
Figure 8:
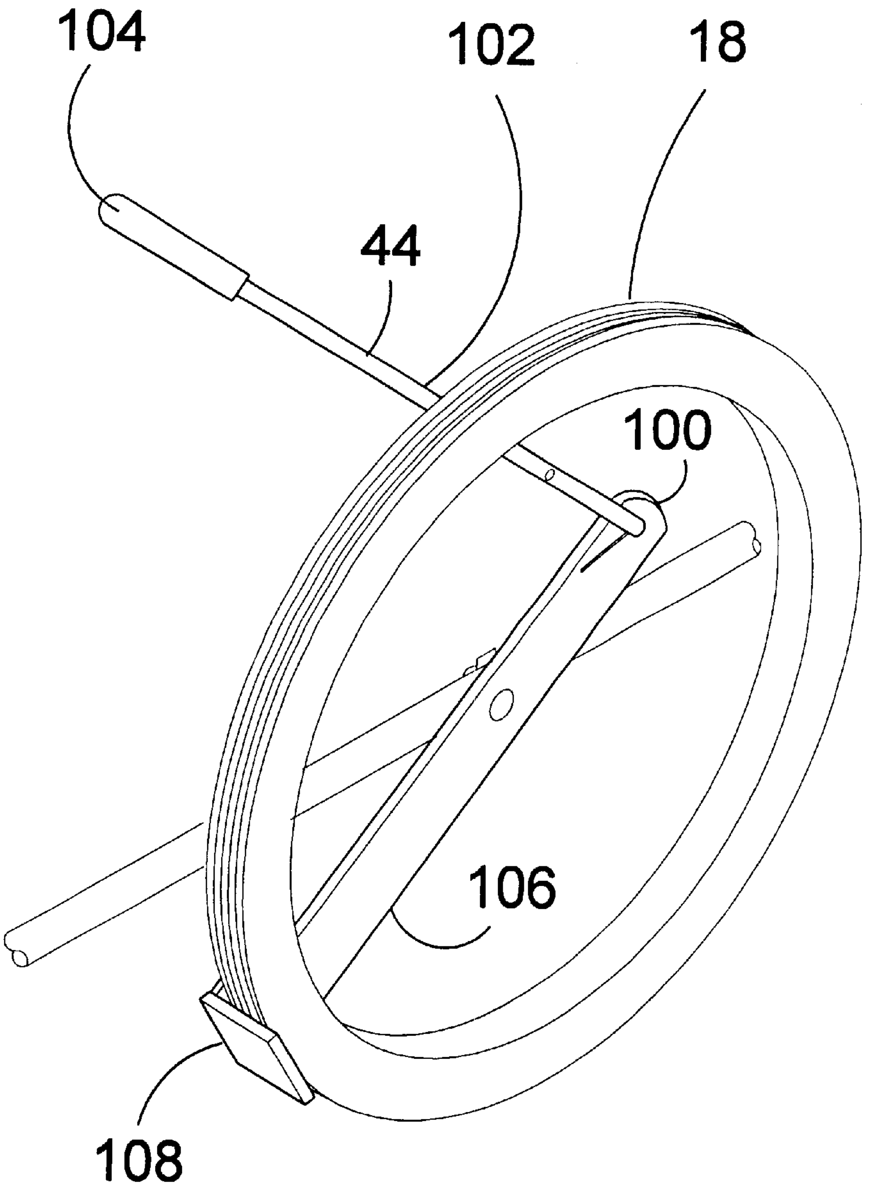
FIG. 8 is an enlarged partial view of the wheelchair's left rear wheel, showing hand brake interaction with the wheelchair frame and left rear wheel, providing means for selectively engaging the drive wheel in a motive or stationary position.
Figure 9:
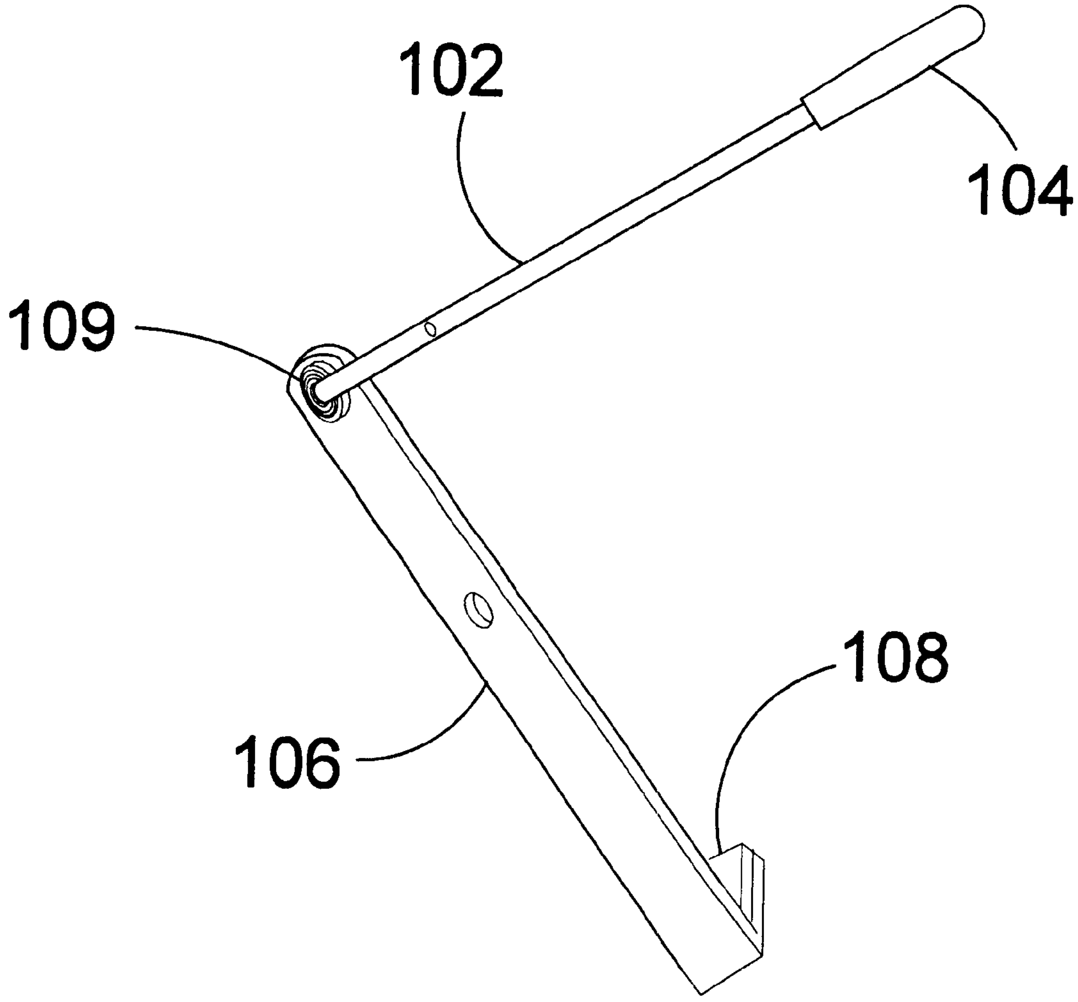
FIG. 9 is an enlarged partial view of the brake member from the opposite side as shown in FIG. 8, revealing the brake spring which biases the brake member to its disengaged position.

FIGS. 4–6 depict representative jack mechanisms 90 for lifting the rear wheels 18, including jacks 90 that are raised and lowered hydraulically (shown), electromechanically (not shown), and manually (not shown). FIG. 2 depicts the junction box 92 that holds two manual pumps 94 for hydraulically raising and lowering the jacks 90. The associated hydraulic lines 94 are also shown. When the occupant chooses to dedicate the wheelchair 12 to the exercise function, he or she manipulates the manual pumps 94 causing the jacks 90 to be raised, and the rear wheels 18 elevated. The tension members 70 are then set to provide the amount of rotational resistance that is required for the goals of the exercise session to be achieved. Once the exercise session is completed, the operator again manipulates the manual pumps 94 causing the jacks 90 to be lowered, and the rear wheels 18 are returned to the surface. After readjusting the tension member 70, the operator is able to resume the normal motive operations of the wheelchair 12.

The junction box 92 depicted in FIG. 2, is also available to contain controls for the analogous operation of raising and lowering electromechanical jacks. In either case, the controls 90 and their electromechanical counterparts do not necessarily require an attached junction box, since other non-frame 14 mounted, handheld controls (not shown) would also suffice.

A single jack (not shown) having a wide base can also be utilized.

Figure 10:
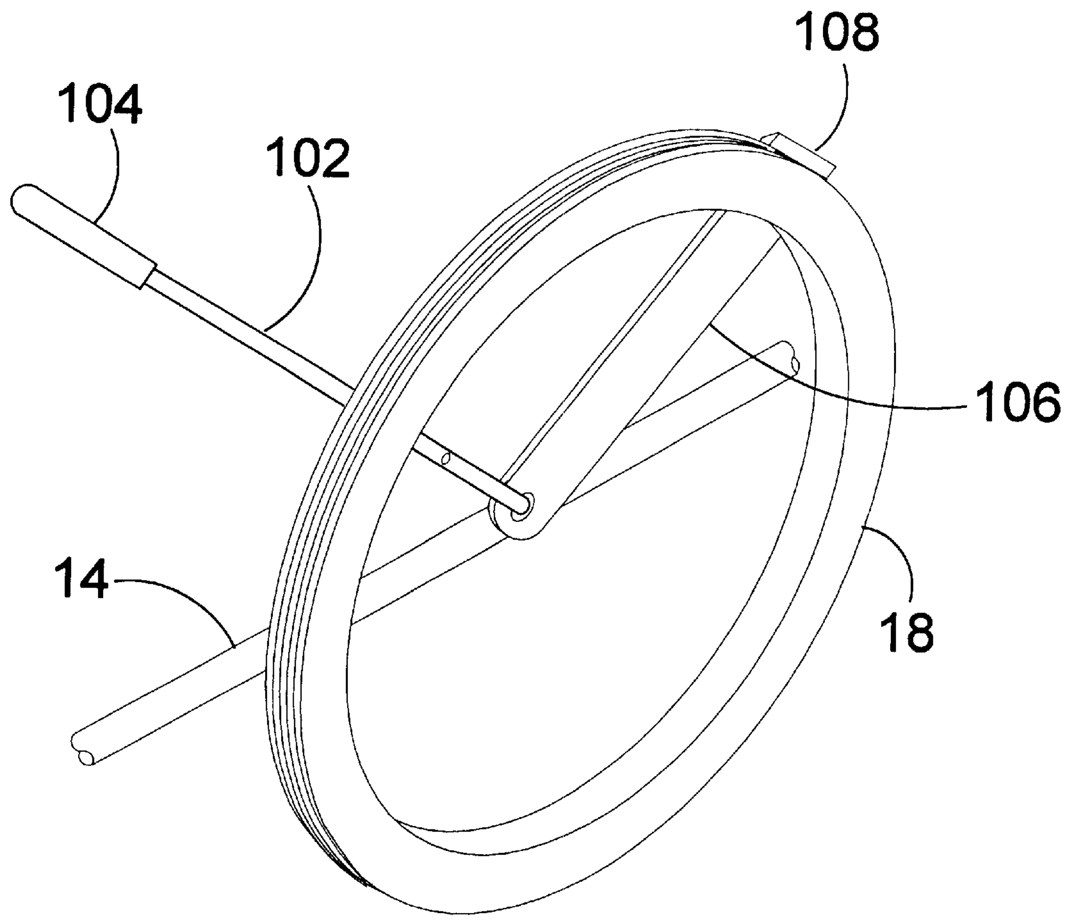
FIG. 10 is an enlarged partial view of the brake member mounted in a position that is reversed from the position shown in FIG. 8.

The unmodified wheelchair 12 is typically stopped by grasping the handrings 24. In embodiments of the present invention in which the handrings 24 are not repositioned adjacent the respective rear wheel gears 30, the brake function is provided by a pair of brake members 100, as shown in FIGS. 2–10. Each of the brake members 100 are pivotally attached to the wheelchair frame 14, and each has a first portion 102 that has a grip 104, and a second portion 106 that has an attached brake pad 108. The brake member 100 is movable from a first position to a second position, the brake pad 108 being brought to bear on the rear wheel 18 in the second position. In the embodiment shown in FIGS. 3–4, the brake member first portion 102 is pushed to the second position. A spring 109 can be provided to bias the brake member 100 to the first position. It is also feasible to reverse the pivotal attachment of the brake member 100 to the wheelchair frame 14, and adjust the angle between the brake member first portion 102 and second portion 106, such that the brake member first portion 102 is pulled to the second position, as shown in FIG. 10. This alternate embodiment allows gravity to assist in the bias to the first position, due to the weight of the brake member first portion 102.

It will be understood that each of the elements described above, or two or more together, may also find a useful application in other types of methods differing from the type described above.

While certain novel features of this invention have been shown and described, and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a wheelchair having a frame, a seat on the frame, two rear wheels attached to the frame, and two pivoting front wheels attached to the frame, the improvement which comprises:

(a) a pair of rear wheel gears, each gear being attached to, and axially aligned with, one of the wheelchair rear wheels;

(b) a pair of housings, each housing being attached to the wheelchair frame;

(c) a pair of axles, each axle rotatably attached to one of the housings;

(d) a pair of reversible ratchet mechanisms, each ratchet mechanism attached to one of the axles;

(e) a pair of handles, each handle positioned for ratcheting one of the ratchet mechanisms, such ratcheting rotating the axles; and (f) a pair of drive gears, each drive gear attached to one of the axles for rotation with the axles, each drive gear meshing with one of the rear wheel gears, such rear wheel rotating when the drive gear rotates; and (g) a pair of adjustable tension members, each tension member being attached to one of the housings and adjustable such that the tension member contacts the axle, such contact creating resistance to the rotation of the axle.

2. The apparatus of claim 1, the handle having an end, and a knuckle, the knuckle being attached to the handle such that the knuckle is substantially perpendicular to the handle, the knuckle being positioned on the handle such that a higher level of force is required to operate the ratchet mechanism when the occupant grasps the knuckle rather than the handle end.

3. The apparatus of claim 1, wherein each handle has a length, the length of each handle being adjustable, such that a higher level of force is required to operate the ratchet mechanism when a shorter handle length is selected.

4. The apparatus of claim 1, further comprising a pin, the handle further having a first and a second portion, the first handle portion having at least one pair of aligned holes, the second handle portion having at least two pairs of aligned holes, at least two of the hole pairs of the second handle portion being alignable with at least one of the hole pairs of the first handle portion, such that the pin may be inserted through the four aligned holes.

5. The apparatus of claim 1, further comprising means for elevating the wheelchair rear wheels off the ground.

6. The apparatus of claim 1, further comprising at least one leg, the at least one leg being adapted for attachment to the wheelchair frame such that the wheelchair rear wheels are elevated off the ground.

7. The apparatus of claim 1, further comprising at least one jack, the at least one jack being attached to the frame such that the wheelchair rear wheels are elevated when the at least one jack is lowered.

8. The apparatus of claim 7, further comprising at least one control for raising and lowering the at least one jack, each control being positionable proximate the wheelchair seat such that the at least one control is operable by a seated occupant.

9. The apparatus of claim 7, wherein the at least one jack is hydraulic.

10. The apparatus of claim 7, wherein the at least one jack is electromechanical.

11. The apparatus of claim 7, wherein the at least one jack is mechanical.

12. The apparatus of claim 1, further comprising means for stopping the wheelchair.

13. The apparatus of claim 1, further comprising a pair of brake members, each brake member having a first end and a second end, each brake member being pivotally attached to the wheelchair frame for selectably moving the brake member between a first and second position, each brake member further having a brake pad attached to the brake member second end, the brake member pad being positioned such that when the brake member first end is moved from the first to the second position, the brake pad engages the wheelchair rear wheel.

14. The apparatus of claim 1, further comprising a pair of handrings, each handring being adjacent one of the rear wheel gears, and positioned for grasping by the occupant.

* * * * *